(12) United States Patent
Monette et al.

(10) Patent No.: US 7,801,039 B2
(45) Date of Patent: *Sep. 21, 2010

(54) METHOD AND NODES FOR PERFORMING BRIDGING OF DATA TRAFFIC OVER AN ACCESS DOMAIN

(75) Inventors: Sylvain Monette, Blainville (CA); Mathieu Giguere, Vaudreuil-sur-le-Lac (CA); Martin Julien, Laval (CA); Benoit Tremblay, Laval (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1179 days.

This patent is subject to a terminal disclaimer.

(21) Appl. No.: 11/353,164

(22) Filed: Feb. 14, 2006

(65) Prior Publication Data

US 2006/0184645 A1    Aug. 17, 2006

Related U.S. Application Data

(60) Provisional application No. 60/651,971, filed on Feb. 14, 2005, provisional application No. 60/674,307, filed on Apr. 25, 2005.

(51) Int. Cl.
*H04L 1/00* (2006.01)
*H04L 12/26* (2006.01)

(52) U.S. Cl. ............... 370/230.1; 370/255; 370/256; 370/386; 370/401; 709/245; 709/220; 709/222

(58) Field of Classification Search ............... 370/230.1, 370/255–256, 386, 401; 709/245, 220–222
See application file for complete search history.

(56) References Cited

U.S. PATENT DOCUMENTS 6,049,531 A * 4/2000 Roy ............... 370/395.53
6,151,324 A * 11/2000 Belser et al. ............ 370/397
6,157,648 A * 12/2000 Voit et al. ............ 370/401

(Continued)

FOREIGN PATENT DOCUMENTS

WO    WO 03/092226    11/2003

OTHER PUBLICATIONS

International Search Report dated Jul. 10, 2006 from corresponding application PCT/IB2006/050487.

*Primary Examiner*—Aung S Moe
*Assistant Examiner*—Benjamin Elliott (57) ABSTRACT

The present invention relates to a method and nodes for performing bridging of data traffic over an access domain. For doing so, for data traffic received at an access node from a first user domain and destined to a second user domain, the access node identifies a service binding corresponding to the received data. Then, the access node tunnels the data traffic in a Unicast message addressed to an access edge node in accordance with the identified service binding. The tunnelled data traffic is then forwarded to the access edge node. The access edge node receives the tunnelled data traffic, and identifies the service binding corresponding to the received tunnelled data traffic. The access edge node then proceeds with redirecting the tunnelled data traffic to a second access node in accordance with the identified service binding therein. The redirected tunnelled data traffic is received at a second access node, where it is detunnelled and forwarded to the second user domain. The method also provides an access node and an access edge node for performing the invention.

13 Claims, 8 Drawing Sheets

U.S. PATENT DOCUMENTS

| | | | |
|---|---|---|---|
| 6,269,404 B1* | 7/2001 | Hart et al. | 709/238 |
| 6,310,862 B1* | 10/2001 | Roy | 370/260 |
| 6,522,627 B1* | 2/2003 | Mauger | 370/230 |
| 6,693,878 B1* | 2/2004 | Daruwalla et al. | 370/235 |
| 6,988,146 B1* | 1/2006 | Magret et al. | 709/238 |
| 7,027,400 B2* | 4/2006 | O'Neill | 370/235 |
| 7,058,022 B1* | 6/2006 | Carolan et al. | 370/254 |
| 7,076,540 B2* | 7/2006 | Kurose et al. | 709/223 |
| 7,127,511 B2* | 10/2006 | Tonouchi | 709/225 |
| 7,197,008 B1* | 3/2007 | Shabtay et al. | 370/218 |
| 7,209,945 B2* | 4/2007 | Hicks et al. | 709/203 |
| 7,305,704 B2* | 12/2007 | Ofek et al. | 726/15 |
| 7,447,203 B2* | 11/2008 | Chen et al. | 370/389 |
| 7,463,639 B1* | 12/2008 | Rekhter | 370/409 |
| 7,496,652 B2* | 2/2009 | Pezzutti | 709/223 |
| 7,536,460 B2* | 5/2009 | Anschutz et al. | 709/226 |
| 7,660,253 B2* | 2/2010 | Monette et al. | 370/235 |
| 2001/0053694 A1* | 12/2001 | Igarashi et al. | 455/433 |
| 2002/0013848 A1* | 1/2002 | Rene Salle | 709/226 |
| 2002/0026503 A1* | 2/2002 | Bendinelli et al. | 709/220 |
| 2002/0027596 A1* | 3/2002 | Roy | 348/14.01 |
| 2002/0035641 A1* | 3/2002 | Kurose et al. | 709/241 |
| 2002/0056008 A1* | 5/2002 | Keane et al. | 709/245 |
| 2002/0080804 A1* | 6/2002 | Ando et al. | 370/401 |
| 2002/0110087 A1* | 8/2002 | Zelig et al. | 370/236 |
| 2002/0120749 A1* | 8/2002 | Widegren et al. | 709/227 |
| 2002/0147828 A1* | 10/2002 | Chen et al. | 709/231 |
| 2002/0191250 A1* | 12/2002 | Graves et al. | 359/128 |
| 2002/0199104 A1* | 12/2002 | Kakemizu et al. | 713/168 |
| 2003/0053450 A1* | 3/2003 | Kubota et al. | 370/356 |
| 2003/0154259 A1* | 8/2003 | Lamberton et al. | 709/213 |
| 2003/0204642 A1* | 10/2003 | Sanders et al. | 709/313 |
| 2004/0044789 A1* | 3/2004 | Angel et al. | 709/238 |
| 2004/0047322 A1* | 3/2004 | O'Neill | 370/338 |
| 2004/0085968 A1* | 5/2004 | Chen et al. | 370/397 |
| 2004/0098531 A1* | 5/2004 | Hagg et al. | 710/315 |
| 2004/0105440 A1* | 6/2004 | Strachan et al. | 370/389 |
| 2004/0136387 A1* | 7/2004 | Rothenhofer | 370/401 |
| 2004/0165600 A1* | 8/2004 | Lee | 370/395.53 |
| 2004/0213224 A1* | 10/2004 | Goudreau | 370/389 |
| 2004/0228356 A1* | 11/2004 | Adamczyk et al. | 370/401 |
| 2004/0261116 A1* | 12/2004 | Mckeown et al. | 725/109 |
| 2004/0264405 A1* | 12/2004 | MacGregor Scobbie | 370/328 |
| 2005/0013297 A1* | 1/2005 | Eriksson | 370/392 |
| 2005/0027782 A1* | 2/2005 | Jalan et al. | 709/200 |
| 2005/0068933 A1* | 3/2005 | Kokkonen et al. | 370/349 |
| 2005/0086495 A1* | 4/2005 | Sheth et al. | 713/182 |
| 2005/0138369 A1* | 6/2005 | Lebovitz et al. | 713/163 |
| 2005/0152271 A1* | 7/2005 | Rindborg et al. | 370/230 |
| 2005/0152370 A1* | 7/2005 | Meehan et al. | 370/393 |
| 2005/0157645 A1* | 7/2005 | Rabie et al. | 370/230 |
| 2005/0185633 A1* | 8/2005 | Shigei | 370/352 |
| 2005/0190775 A1* | 9/2005 | Tonnby et al. | 370/401 |
| 2005/0257039 A1* | 11/2005 | Marshall | 713/1 |
| 2005/0265309 A1* | 12/2005 | Parandekar | 370/351 |
| 2006/0120386 A1* | 6/2006 | Rossi et al. | 370/401 |
| 2006/0143702 A1* | 6/2006 | Hisada et al. | 726/15 |
| 2006/0182123 A1* | 8/2006 | Monette et al. | 370/395.53 |
| 2006/0184645 A1* | 8/2006 | Monette et al. | 709/218 |
| 2006/0184694 A1* | 8/2006 | Monette et al. | 709/246 |
| 2006/0184695 A1* | 8/2006 | Monette et al. | 709/246 |
| 2006/0245435 A1* | 11/2006 | Sajassi | 370/395.53 |
| 2006/0251055 A1* | 11/2006 | Monette et al. | 370/352 |
| 2007/0101377 A1* | 5/2007 | Six et al. | 725/86 |
| 2008/0101343 A1* | 5/2008 | Monette et al. | 370/352 |
| 2008/0120714 A1* | 5/2008 | Monette et al. | 726/11 |
| 2009/0010265 A1* | 1/2009 | Vishnubhotla et al. | 370/395.53 |

* cited by examiner

Service Agents mngt and Control unit 342

| Service Agent | Service Type | Properties | Service Provider Port |
|---|---|---|---|
| SA$_0$ | Service A | Bw$_1$, Q$_o$S$_2$, IP$_{v4}$ | Port XXY |
| SA$_1$ | Service B | Q$_o$S$_1$, Bw$_2$ | Port XYZ |
| SA$_2$ | UD$_1$ to UD$_2$ | Bw$_2$, Q$_o$S$_2$, IP$_{v6}$ | ----- |
| ... | ... | ... | ... |

Service Bindings Hosting Unit

| $SA_{ID}$ | Service Type | User MAC info | User port on access node | Local network context | Access Node MAC |
|---|---|---|---|---|---|
| $SA_1$ | Service A | MAC add 1 | Port ABC | Local identifier X | $AN_1$ MAC |
| $SA_2$ | UD to UD | MAC add $2_A$<br>MAC add $2_B$ | Port AAB<br>Port BAC | Local identifier Y<br>Local identifier W | $AN_1$ MAC<br>$AN_2$ MAC |
| $SA_3$ | Service B | MAC add 3 | Port ABA | Local identifier Z | $AN_2$ MAC |
| ... | ... | ... | ... | ... | ... |

Transport Primitives

METHOD AND NODES FOR PERFORMING BRIDGING OF DATA TRAFFIC OVER AN ACCESS DOMAIN

PRIORITY STATEMENT UNDER 35 U.S.C. S.119 (e) & 37 C.F.R. S.1.78

This non-provisional patent application claims priority based upon the prior U.S. provisional patent applications entitled "Poly project" and "Access node-edge node complex protocol (AEP)", having respective application No. 60/651, 971, filed Feb. 14, 2005, in the names of Sylvain Monette, Mathieu Giguere, Martin Julien and Benoit Tremblay, and application No. 60/674,307, filed Apr. 25, 2005 in the names of Sylvain Monette, Mathieu Giguere, Martin Julien and Benoit Tremblay.

BACKGROUND OF THE INVENTION

1. Field of the Invention

The present invention relates to a method and nodes for performing bridging of data traffic over an access domain.

2. Description of the Related Art

Recent years have seen the explosion of Internet Protocol (IP) networks. Initially developed to allow universities and researchers to communicate and cooperate in research projects, it has grown into networks offered at a mass-market level. Nowadays, it is normal for households to have a connection to an IP network to surf the world-wide-web, play interactive games, carry Voice over IP, download documents and softwares, make electronic business transactions, etc.

Figure 1:
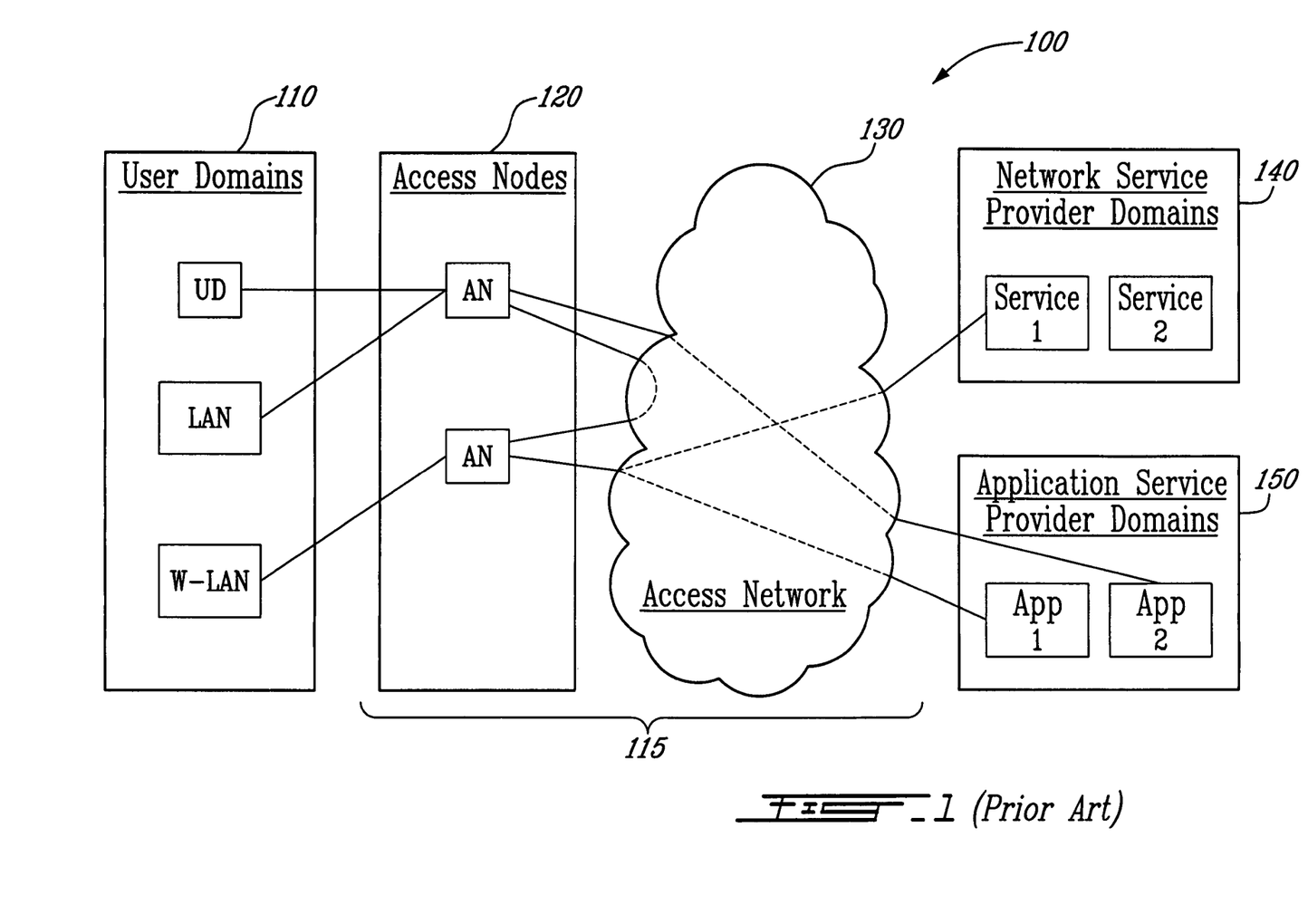
FIG. 1 is a prior art example of an IP network.

Reference is now made to FIG. 1, which represents a prior art example of an IP network 100. Typically, an IP network is composed of an access domain 115, network service provider domains 140 and application service provider domains 150. The access domain 115 includes Access Nodes (AN) 120 and an access network 130, such as an IP network. The ANs 120 are network providers, which can offer access to the IP network 130 to user domains 110. The user domains 110 include for example User Devices (UDs) (such as computers, mobile phones, personal digital assistants, etc.), Local Area Networks (LANs) and Wireless-LANs (W-LANs). The user domains communicate with the ANs over various possible technologies. Amongst those technologies can be found dial-up connections and Asymmetric Distribution Subscriber Line connections over telephone lines, cable modems connecting over television cable networks, or wireless communications. The access network 130 is composed of a group of independent routers, which task is to route incoming data traffic based on a destination address embedded therein. As for the network service provider domains 140, they may correspond for example to Voice over IP services, while the application service provider domains 150 may correspond to electronic banking and electronic business transactions.

Though FIG. 1 depicts three user domains, two Access Nodes, two service provider domains and two application service domains, IP networks 100 typically include several thousands of user domains, tenths of Access Nodes, hundreds of service provider domains and application service provider domains. As to the access network 130, it is common to encounter networks including hundreds of routers. It is thus understood that FIG. 1 depicts a highly simplified IP network 100 for clarity purposes.

The initial principle at the basis of IP networks is to rely on switches and routers, which perform as few and as little operations as possible before routing incoming data traffic towards their final destination. For doing so, different kinds of messages are available: Unicast messages, Multicast messages and Broadcast messages. For each of those three types of messages, ranges of addresses are allocated for each type of messages. Unicast messages are used to exchange messages between one sender and one recipient. Multicast messages allow one sender to reach multiple recipients. As to broadcast messages, they are used to reach all switches part of a segment of the IP network.

More particularly, Unicast messages are used to communicate data between user domains 110 and network service provider domains 140 and/or application service provider domains 150. Unicast messages can also be used to communicate data between user domains 110. Whenever Unicast messages are used on the access network 130, the switches (not shown for clarity purposes) of the access network 130 need to switch the corresponding packets so as to forward the Unicast message to its destination. In expansive networks, such as IP networks, switches have to maintain large tables to allow proper switching of the packets. In addition, the forwarding of Unicast messages from a source to a destination may necessitate the interaction of many switches, thus resulting in a lot of data traffic on the access network 130 for one Unicast message.

There is currently no known solution to the problems associated with the explosion of the number of user devices and of service providers offering services on IP networks. Furthermore, no long-term solution has been identified to allow a tangible solution to the increasing data traffic of large IP networks servicing thousands of User Domains.

Accordingly, it should be readily appreciated that in order to overcome the deficiencies and shortcomings of the existing solutions, it would be advantageous to have a method and nodes for efficiently performing bridging of data traffic over an access domain, thus tangibly reducing data traffic and offloading the network. The present invention provides such a method and nodes.

SUMMARY OF THE INVENTION

The present invention efficiently allows thousands of user domains to send and received data traffic over an access domain by using service bindings.

For doing so, the method of the present invention performs bridging of data traffic over an access domain. More particularly, for data traffic received at a first access node from a first user domain, a corresponding service binding is identified. Then, the received data traffic is tunnelled in a Unicast addressed to an access edge node in accordance with the identified service binding. Afterwards, the tunnelled data traffic is forwarded to the access edge node. Upon receipt of the tunnelled data traffic at the access edge node, the service binding corresponding thereto is identified. The tunnelled data traffic is then redirected to a second access node in accordance with the identified service binding. And, upon receipt of the redirected tunnelled data traffic at the second access node, the tunnelled data traffic is detunnelled and forwarded to the second user domain.

Another aspect of the present invention relates to an access edge node, adapted to perform the method of the present invention. More precisely, the access edge node includes an access domain input/output unit for receiving and sending data traffic on the access domain and a service bindings hosting unit for storing information on service bindings implicating the access edge node. The access edge node also includes a controlling unit. The controlling unit performs multiple roles: i) determining that the received data traffic at the access domain input unit is a Unicast message for bridging data traffic from a first user domain towards a second user domain, ii) identifying with the service bindings hosting unit a service binding corresponding to the Unicast message, iii) modifying a destination address of the Unicast message to correspond to an address of a serving node of the second user domain in accordance with the identified service binding, and iv) handing over the modified Unicast message to the access domain input/output unit for sending over the access domain.

In another aspect, the present invention is directed to an access node for bridging data traffic over an access domain. The access node includes a user domain input unit, a service binding unit, a bridging unit, a controlling unit and an access domain output unit. More particularly, the user domain input unit receives data traffic from a first user domain, the received data traffic being destined to a second user domain. The service binding unit stores service bindings related information. Each service binding rules data traffic between one of multiple user domains and an access edge node by committing the access node and the access edge node in a manner of managing data traffic therebetween over the access domain. The bridging unit tunnels the received data traffic in a Unicast message addressed to the access edge node in accordance with a service binding corresponding to the received data traffic. The controlling unit performs the identification of the corresponding service binding, and forwards the received data traffic to the bridging unit for tunnelling with an indication of the corresponding service binding. As for the access domain output unit, it receives from the bridging unit the tunnelled data traffic and forwards the tunnelled data traffic over the access domain.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

The innovative teachings of the present invention will be described with particular reference to various exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views.

The present invention provides a method and nodes for performing bridging of data traffic over an access domain. Access domains, as known in the art, are composed of a multitude of switches, which task is to switch data traffic to its destination. The data traffic that is carried on the access domain originates from user domains and service provider domains. With the increasing interest of applications like the World Wide Web, the number of user domains and service provider domains forwarding and receiving data traffic being carried on access domains is exploding. To be able to properly switch the data traffic, each of the switches has to acquire some knowledge by performing a process known and called Media Access Control (MAC) learning, by which each switch learns on which port a MAC address is reachable to send data traffic to the right port rather than sending it on all ports. But with the exploding number of user domains and service provider domains exchanging data traffic over access domains, the table in the switches are also becoming quite voluminous. Another problem also resides in the performing of accounting function on the traffic over networks such as in the present invention. It is thus important to find ways to reduce the number of MAC addresses learnt by the switches. It is also becoming necessary to provide a simple method to stream data traffic between two user domains. For doing so, the present invention introduces an access edge node in the access domain. Furthermore, the present invention uses service bindings between the access nodes and the access edge node so as to stream data traffic therebetween over the access domain. Finally, the present invention performs bridging of data traffic between two user domains using the access edge node, and service bindings between the serving access nodes and the access edge node.

Figure 2:
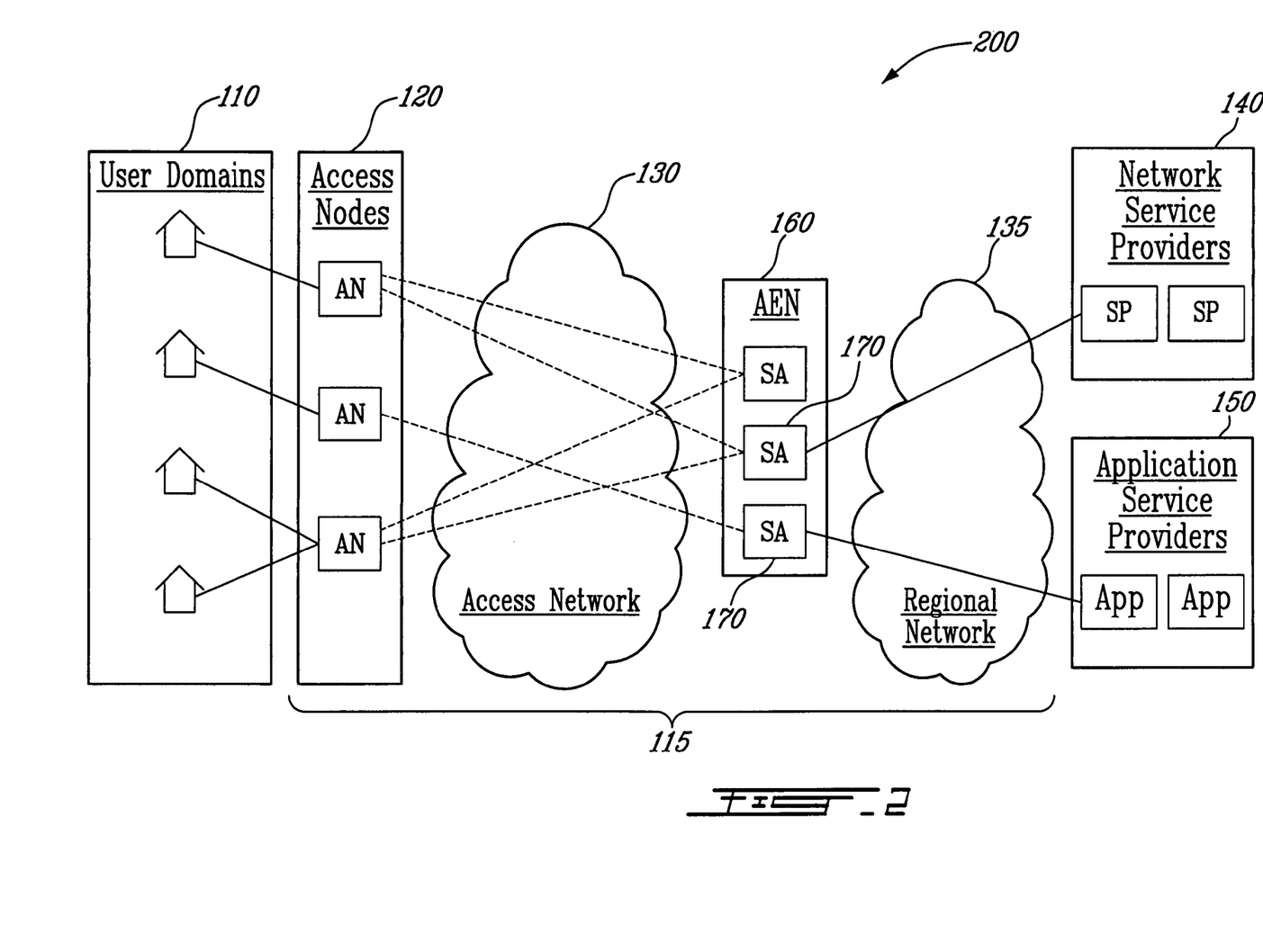
FIG. 2 is a schematic exemplifying a network in which the present invention has been incorporated.

To understand the present invention and its inventive mechanisms, reference is now made to FIG. 2, which is a schematic exemplifying a network 200 in which the present invention has been incorporated. The schematic representation of the network 200 has been simplified for clarity purposes, and the various elements depicted have been grouped by similar functions rather than graphically representing geographical network entities. However, each group of similar functions would typically correspond to a multitude of physical network entities performing those specific functions, geographically scattered throughout the network 200. The schematic representation of the network 200 includes user domains 110, an access domain 115 (including: access nodes 120, an access network 130, an access edge node 160 and a regional network 135), network service providers 140, and application servers 150. An exhaustive description and examples for each of those elements will be provided in the following paragraphs, with continued reference to FIG. 2.

The network 200 corresponds to one or multiple data networks communicating together. Thus, the network 200 could be operated by one or multiple operators. As data networks are usually supported by a number of different operational entities and/or organizations, it is necessary to define how those entities and organizations can successfully communicate. For this reason, data networks are usually explained and detailed using the Open System Interconnection (OSI) model. The OSI model defines a networking framework for implementing protocols in seven layers. Those seven layers are in the respective order: 1) Physical layer; 2) Data Link Layer; 3) Network Layer; 4) Transport Layer; 5) Session Layer; 6) Presentation Layer and 7) Application Layer. Each layer corresponds to an aspect to be considered and actions to be undertaken when performing data transmission over a data network. Using the OSI model to describe the network 200 of the present invention, it is possible to layer some of the various protocols used and/or supported by the network 200 of the present invention as follows:

Layer 2: Ethernet, Asynchronous Transfer Mode;
Layer 3: Internet Protocol (IP) versions 4 and 6,
Layers 4 and 5: Transmission Control Protocol (TCP) and User Datagram Protocol (UDP); and
Layers 6 and 7: various presentations and applications protocols currently existing and to come.

It should be understood that the above list of protocols is provided for exemplary purposes, rather than for limiting the protocols supported by the present invention. For simplicity purposes, the foregoing description will make reference to Ethernet and IP, but such protocols are used as an example only. The expressions Ethernet and IP should be interpreted respectively as Layer 2 protocols and Layer 3 protocols. It should be noted that in the present description, use of the word "domain" refers to one or multiple network elements sharing similar functional features.

Turning now to the access domain 115, it is possible to summarize its function as a means to provide end-to-end access between the user domains 110 and the network service providers 140 and application service providers 150. The access domain includes the access nodes 120, the access network 130, the regional network 135 and the access edge node 160. Thus, the access domain 115 is not an entity per se; it is rather an aggregation of components, which when interconnected together either directly or indirectly, acts as a domain for providing access, hence its name "access domain". It should also be clear that the current representation of the access domain 115 including only one access node 120, one access network 130, one access edge node 160 and one regional network 135 does not mean that such entities are found single in the access domain, but rather that for sake of clarity only one such entity is represented. The following paragraphs explain in greater details the various components of the access domain.

The access nodes 120, which also include access gateways (not shown), represent the first component of the access domain 115. The access nodes 120 typically refer to access providers, which allow user domains 110 accesses to the access network 130, upon, for example, subscription or pay-per-usage basis. Such access can be made possible using various mediums and technologies. Amongst the possible mediums are cable, landline phone, and wireless phone. As to the possible technologies, Integrated Services Digital Network (ISDN) and Asymmetric Digital Subscriber Line (ADSL), Worldwide Interoperability for Microwave Access (WiMax) are examples of possible technologies. However, it should be noted that the present invention is not limited to those mediums or technologies. Also, even though only three access nodes have been depicted, it should be noted that the network 200 potentially includes hundreds or thousands of access nodes.

The access domain also includes the access network 130 and the regional network 135 which will be discussed together. The primary function of the access network 130 and the regional network 135 is to provide end-to-end, and independent transport between the access nodes 120 and the network service providers 140 and the application service providers 150. The access network 130 and regional network 135 are networks capable of tasks such as: aggregation, switching and routing downstream and upstream data traffic. The access network 130 is preferably capable of using Ethernet, or other similar protocols, which correspond to the Layer 2 of the OSI model, but is not limited thereto. It could advantageously be capable of supporting IPv4 and/or IPv6. The regional network 135 preferably supports Ethernet and/or IP and MPLS, and possibly other Layer 3 capable protocols. Furthermore, it should be noted that the access network 130 and the regional network 135 could be operated and/or managed by a single operator or by many different operators. Both the access network 130 and the regional network 135 are composed of multiple switches (not shown) which handle switching data traffic there through.

It is through a tight coupling of their traffic-engineering capabilities through the access edge node 160, that the access network 130 and the regional network 135 can provide end-to-end Quality of Service (QoS). The access edge node's role 160 is the creation, management and hosting of service agents 170 and service bindings (not shown in FIG. 2, but depicted on FIG. 3). Each of the service agents 170 corresponds to either one of the service provider domains (140 or 150) or an access network bridging capability. Each of the service agents 170 manages and controls a Virtual Local Area Network (VLAN) over the access network 130. The expression "service binding" refers to a binding between the user domain 110 and one of the service agents 170 of the access edge node 160. The access edge node 160 and the concepts of service agents 170 and service bindings will be described in further detail in the description referring to FIGS. 3, 4a and 4b.

Turning now to the user domains 110, the latter rely on the access domain 115 for providing an entry point into the access domain 115. In the context of the present invention, the expression "user domains" alternatively refers to independent computers, local networks of computers connected through a router either physically or wirelessly, wireless phones, Personal Digital Assistants (PDAs), and all other devices that are capable of data communication over a data network such as network 200. Additionally, the expression "user domain" is intended to also include multiple simultaneous data traffic sessions performed with a multitude of devices, through one single user port. For example, a user could concurrently access different applications and network services such as Internet access, video conferencing, and television programs with one or multiple devices through a user domain located VLAN, or one single user port referred to herein as "user domain".

The network service providers 140 refer for example to entities that use the access domain 115 to provide IP addressing and connectivity to another IP network, and to offer and deliver specific application. In the context of data traffic with the user domains 110, the network service providers 140 typically own and assign IP addresses to the user domains 110, using identification based on for example Remote Authentication Dial-In User Service (RADIUS). The network service providers 140 may further perform user-level authentication and authorization if desired and/or necessary.

The application service providers 150 use the access domain 115 to offer and deliver application(s) to end-users of the user domains 110. Examples of such applications include gaming, video on demand, videoconferencing, and many other possible applications. It is however the access domain 115 that assigns IP addresses on behalf of the applications service providers to the user domains 110. If desired, the application service providers 150 can also perform authentication at the user-level and authorization if necessary. It should be noted that in the foregoing description, the expression "service providers" and "service providers domains"

will be alternatively used to represent concurrently both network service providers 140 and application service providers 150, and the expression "service provider" represents one of the network service providers 140 or application service providers 150.

As previously mentioned, a service binding relates to a transport relationship. In the context of the present invention, that transport relationship is established between two user domains, and directly impacts the serving access nodes 120 and the access edge node 160. Conceptually speaking, the creation of a service binding corresponds to adding the identified user domains to the VLAN corresponding to the serving agent over the access domain. Thus, each service binding may represent a tradable business entity, which guarantees delivery of the corresponding service. Service bindings are created, managed and hosted in the access edge node, and exist in combination with the service agents 170. Service bindings are also hosted in the access nodes for which they rule data traffic.

Figure 3:
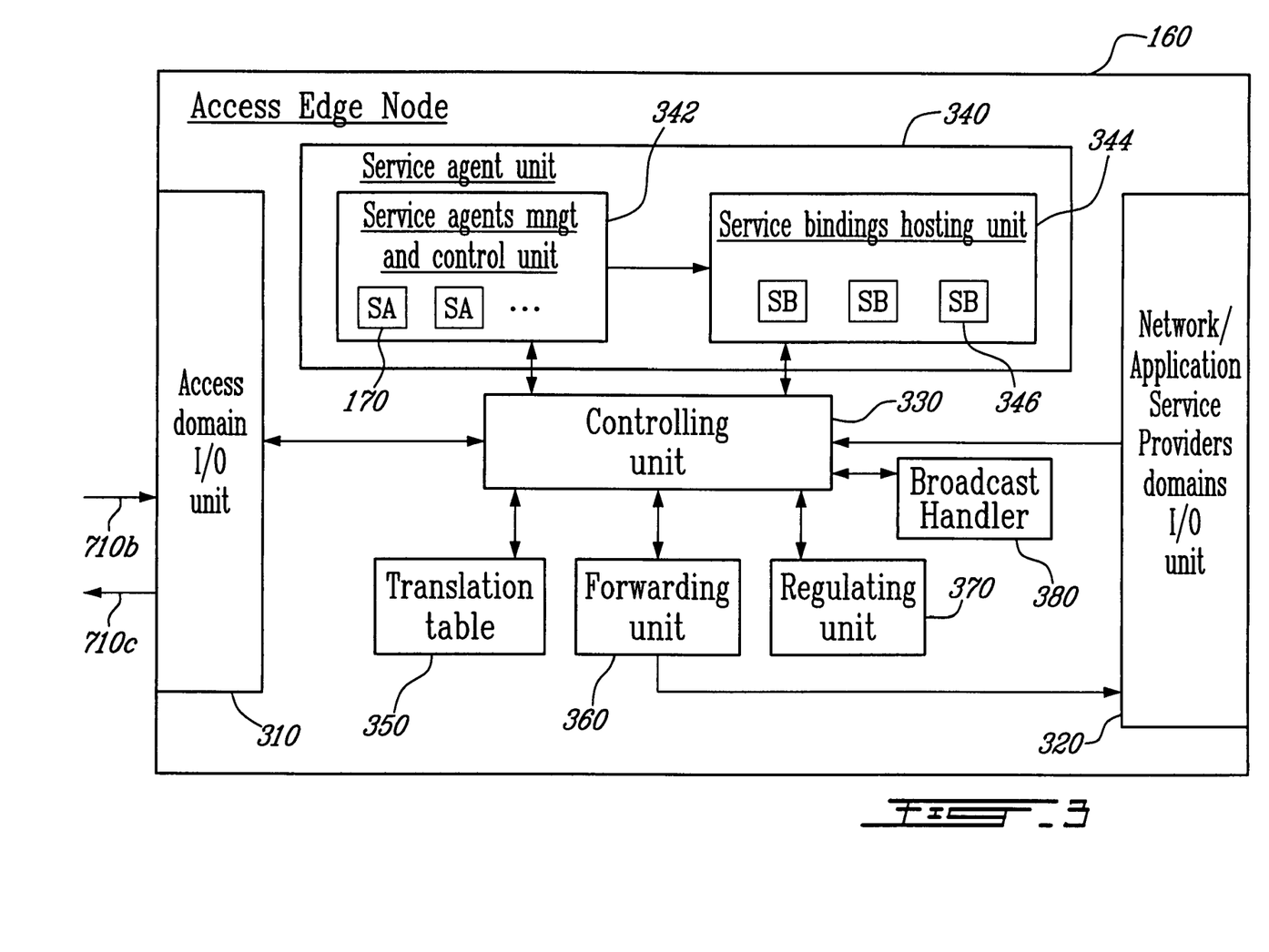
FIG. 3 is a schematic representation of an access edge node in accordance with the teachings of the present invention.

Since the service agents and service bindings are created, managed and hosted in the access edge node, reference is now made concurrently to FIGS. 2 and 3, where FIG. 3 is a schematic representation of an access edge node in accordance with the teachings of the present invention. To be able to perform the tasks of creation, management and hosting of the service agents and service bindings, the access edge node is composed of multiple elements. Because of its location in the access domain 115, the access edge node includes an access domain input/output unit 310 for communicating with the access nodes 120 over the access network 130. The access edge node 160 also includes a network/application service provider domains input/output unit 320 for communicating with the network service providers 140 and application service providers 150 over the regional network 135. Furthermore, the access edge node 160 includes a service agent unit 340, a controlling unit 330, and may optionally further include a translation table 350, a forwarding unit 360, a regulating unit 370 and a broadcast handler 380.

The service agent unit 340 is composed of a service agents' management and control unit 342 and a service bindings hosting unit 344. The service agent unit 340 keeps existing service agents' 170 information in the service agents' management and control unit 342. The service agents' management and control unit 342 in turn is responsible for the creation and management of the service bindings 346. For doing so, the service agents management and control unit 342 determines when new service bindings 346 are required or an existing service binding can be removed, and proceeds with the creation/removal of service binding 346. The service agents' management and control unit 342 is also responsible for the adding/removal of user devices to existing service bindings. Furthermore, the service agents management and control unit 342 is responsible for ensuring synchronicity of service bindings 346 related information with access nodes with which it is interacting.

Figure 4A:
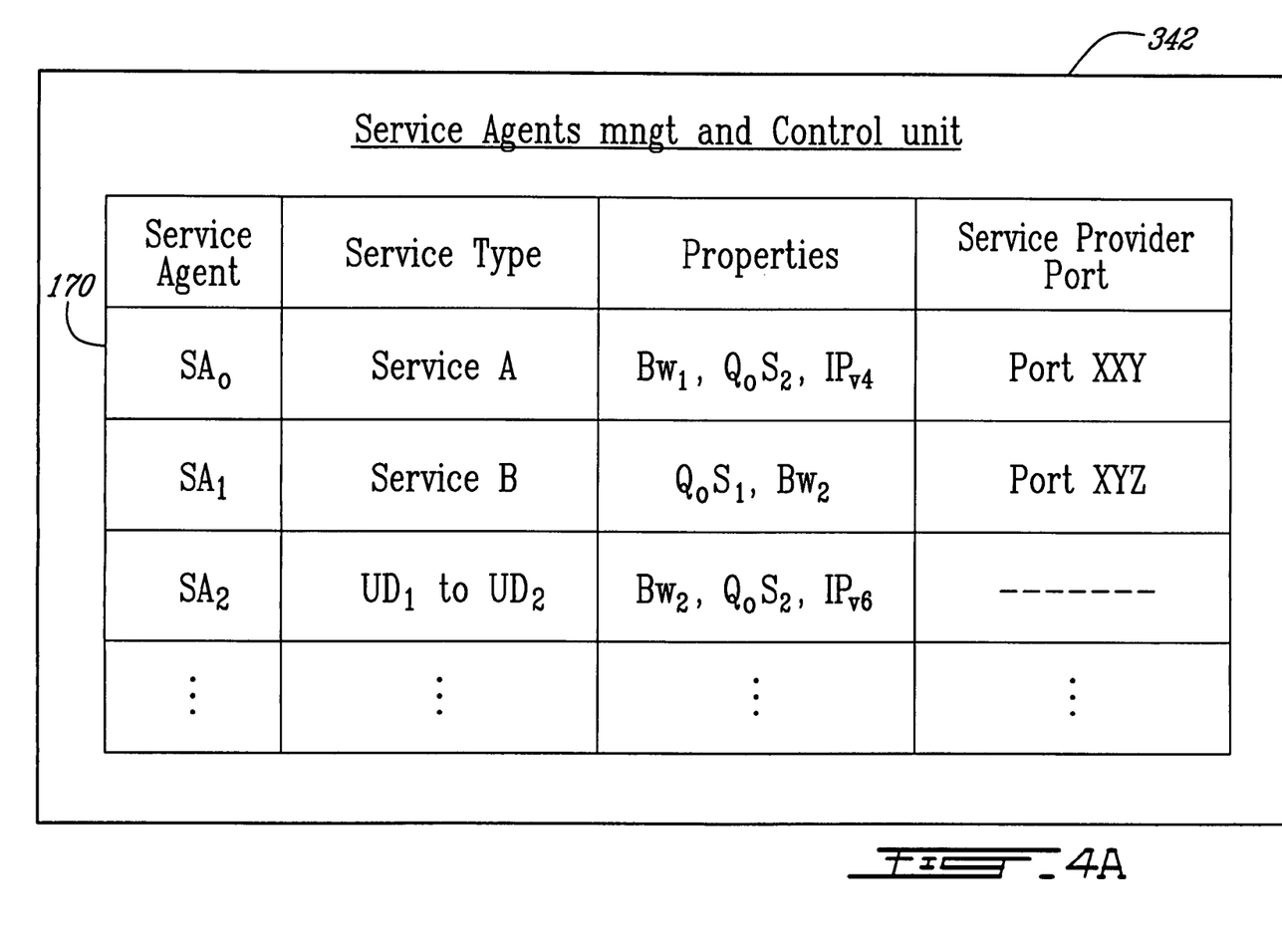
FIG. 4*a* is an exemplary tabular representation of the content of a service agent's management and control unit in accordance with the present invention.

Reference to FIG. 4a, which represents an exemplary tabular representation of the content of the service agents' management and control unit 342, is now concurrently made with FIG. 3. Each of the rows of FIG. 4a, at the exception of the first row, which is a header row, represents exemplary content of one of the service agents 170 managed and controlled by the service agents management and control unit 342. Each of the columns of FIG. 4a corresponds to specific information, maintained by the service agents' management and control unit 342, for each of the service agents 170. The first column represents an identification of the service agent 170. That identification is typically a numerical identifier acting as a service agent identifier. In accordance to a preferred embodiment of the invention, each service agent in the access edge node has a unique service agent identifier. The second column refers to an identification of a specific service type for the corresponding service agent. For example, in cases where one service provider domain 140 or 150 offers multiple services, each of the services offered is associated with a different service type so as to differentiate between the various services of a service provider domain. The third column identifies the preferred or necessary Quality of Service (QoS) required for properly transporting data traffic for that service agent and related service type. Exemplary criteria for QoS may include delay, bit error rate, bandwidth, and preferred protocol. The fourth column indicates a port to be used by the access edge node 160 to further route the incoming data traffic related to that particular service agent. In addition to this content, the service agents' management and control unit 342 includes sufficient logical software and hardware to create additional service agents and remove unnecessary service agents. It should be noted as well that even though the content of the service agents' management and control unit has been represented in FIG. 4a in the form of a table, such content is not limited thereto. The service agents' management and control unit could be composed of a relational database, hard coded components, microprocessors, programming library, etc . . .

Figure 4B:
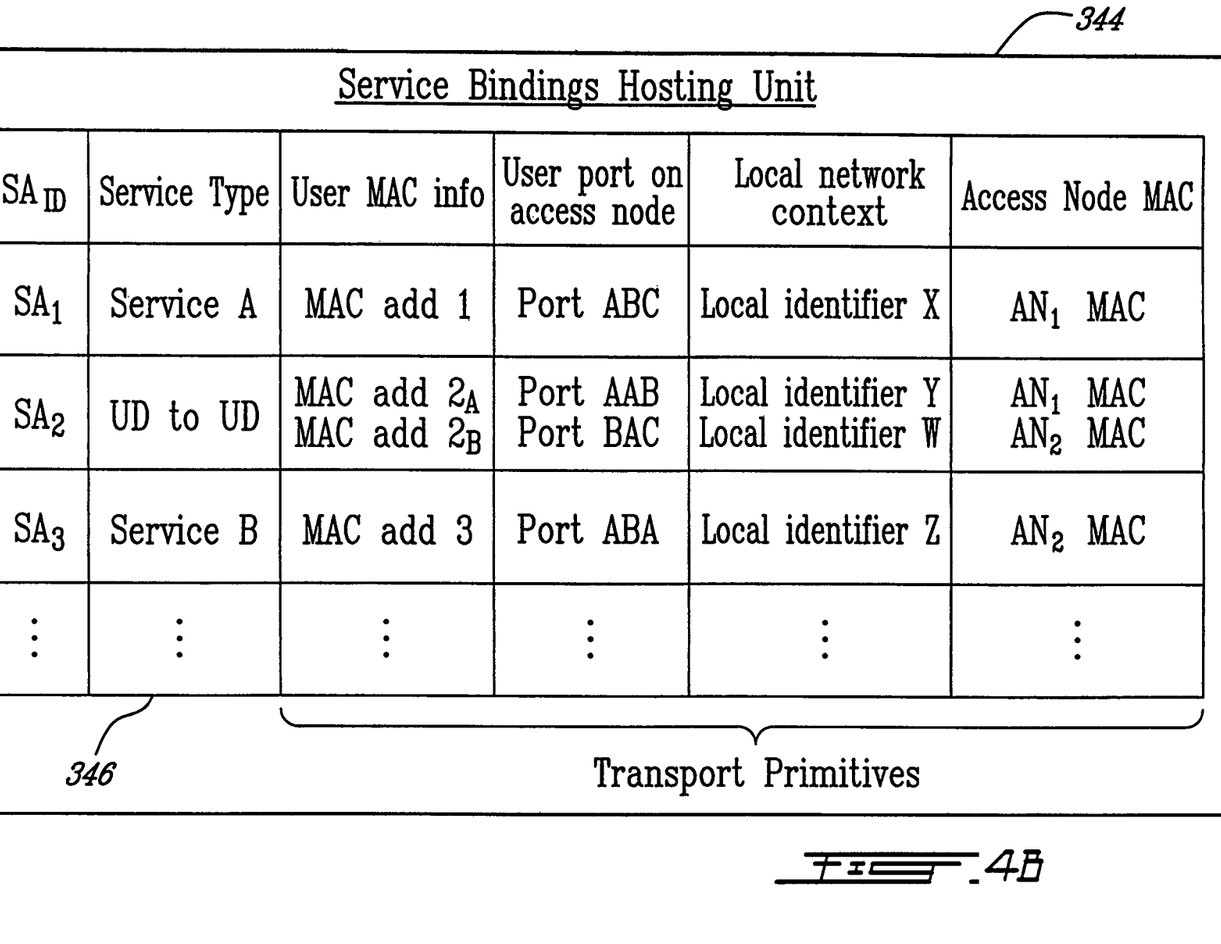
FIG. 4*b* is an exemplary tabular representation of the content of a service bindings hosting unit in accordance with the teachings of the present invention.

Reference is now made to FIG. 4b, which represents an exemplary tabular representation of the content of the service bindings hosting unit 344, concurrently with FIG. 3. Each of the rows of FIG. 4b, at the exception of the header row, represents exemplary content of some of the service bindings 346 hosted in the service bindings hosting unit 344. Each of the columns of FIG. 4b depicts possible information, hosted in the service bindings hosting unit 344, for each of the service bindings 346. However, such information should not be construed as "essential" information, as the information listed in FIG. 4 represents examples of fields that could be used to perform the present invention. The first column represents an identification of a corresponding service agent, by using for example the service agent identifier of the service agent. The second column identifies the service type, as described in relation with FIG. 4a. The other columns represent the transport primitives for data traffic related to the service binding. More specifically, the third column identifies a user domain MAC address. The fourth column consists of an identification of a port used by the user domain when communicating with the serving access node. The fifth column corresponds to the local network arbitrary identifier used by the user domain, and may include for example implicit or explicit local VLAN information. The sixth column refers to a MAC address of the access node serving the user domain. Alternatively, the columns for the User MAC info and the local network context could be replaced, with a column storing information on the virtual access edge node MAC address (access edge node MAC address and input port thereof) on which to send the traffic. Hence, each service binding 346 binds together one of the service agents and two of the access nodes for providing data traffic over the access domain 115. It should be noted that even though the content of the service bindings hosting unit 344 has been represented in FIG. 4b in the form of a table, such content is not limited thereto. The service bindings hosting unit could be composed of a relational database, hard coded components, microprocessors, programming library, etc . . .

The combination of the input port and VLAN information thus represents a simple and reliable way of quickly relating incoming data traffic to the proper service binding. Other combinations of information could also be used to reliably match incoming data traffic with a corresponding service binding. For example, in accordance with a first embodiment of the present invention, the user domain to user domain bridging of the present invention may consist of a port level bridging. As previously briefly described, port level bridging consists of bridging the data traffic between a port of a first access node to a port of a second access node, without touching other fields of the Ethernet message, such as the VLAN Tag field. In accordance with a second embodiment of the present invention, the user domain to user domain bridging of the present invention consists of a subnet level bridging. For doing so, the data traffic between the first user domain and the second user domain is bridged using the input port information of the first access node and corresponding to a first VLAN, and input port information of the second access node and its corresponding second VLAN. Typically, once the service binding has been created and the access node has been informed thereof, data traffic therebetween can be performed over the access domain in accordance with the service binding.

More particularly, in the case of the present invention, where the service agent corresponds to providing a user domain to user domain streaming of data traffic, the service binding 346 hosted in the service bindings hosting unit 344 alternatively provides necessary information of a first and a second user domains. Therefor, as shown in the row corresponding to the service agent identifier SA2, the service type corresponds to the user domain to user domain streaming, the User MAC info includes a MAC address of the first user domain and another MAC address corresponding to the second user domain. The fields corresponding to the user port information, the local network context and serving access node MAC address also provide related information for both the first and second user domains. Alternatively, in accordance with another embodiment of the present invention, the user MAC addresses could be replaced by input/output port identifications of the access domain input/output unit, and the local network contexts could correspond to VLAN information.

Returning now to the description of FIG. 3, the controlling unit 330 of the access edge node is responsible for determining, upon receipt of data traffic 710b, whether it corresponds to one of the service agents. For doing so, the controlling unit 330 accesses the information contained in the header of the data traffic, and consults the service agents' management and control unit 342 to determine whether one of the service agents 170 corresponds to the information contained in the header. In cases where the bridging of data traffic is performed for two user domains being serviced by different access edge nodes, the controlling unit creates an MPLS Layer 2 tunnelling of the received data traffic between the two implicated access edge nodes.

If needed, the controlling unit 330 may optionally interact with the translation table 350. Since each service agent 170 of the service agents' management and control unit is uniquely identified by a service agent identifier, it is necessary to keep in the translation table a mapping between the service agent identifier corresponding to service agents 170 and corresponding service provider domains (140 or 150), when applicable. Thus, upon receipt of data traffic at the access domain input/output unit 310 having a destination address corresponding to a virtual MAC address for the access edge node 160, the controlling unit 330 consults the translation table 350 to obtain a fast translation of the access edge node virtual MAC address to the destination service provider domain (140 or 150) address. In the context of the present invention, a virtual MAC address is a representation of the physical address of the node and related port information of the corresponding input/output unit.

The controlling unit 330 further consults with the forwarding unit 360, to determine whether received data traffic at the access domain input/output unit 310 is to be directly forwarded to the service provider domains input/output unit without any modification.

Finally, the controlling unit 330 can also interact with a regulating unit 370, which can perform, on received data traffic at either the access domain input/output unit 310 and the network/application service providers domain input/output unit 320, downstream/upstream traffic policing and marking, traffic remarking, as indicated and/or required by corresponding service agents 170.

Figure 5:
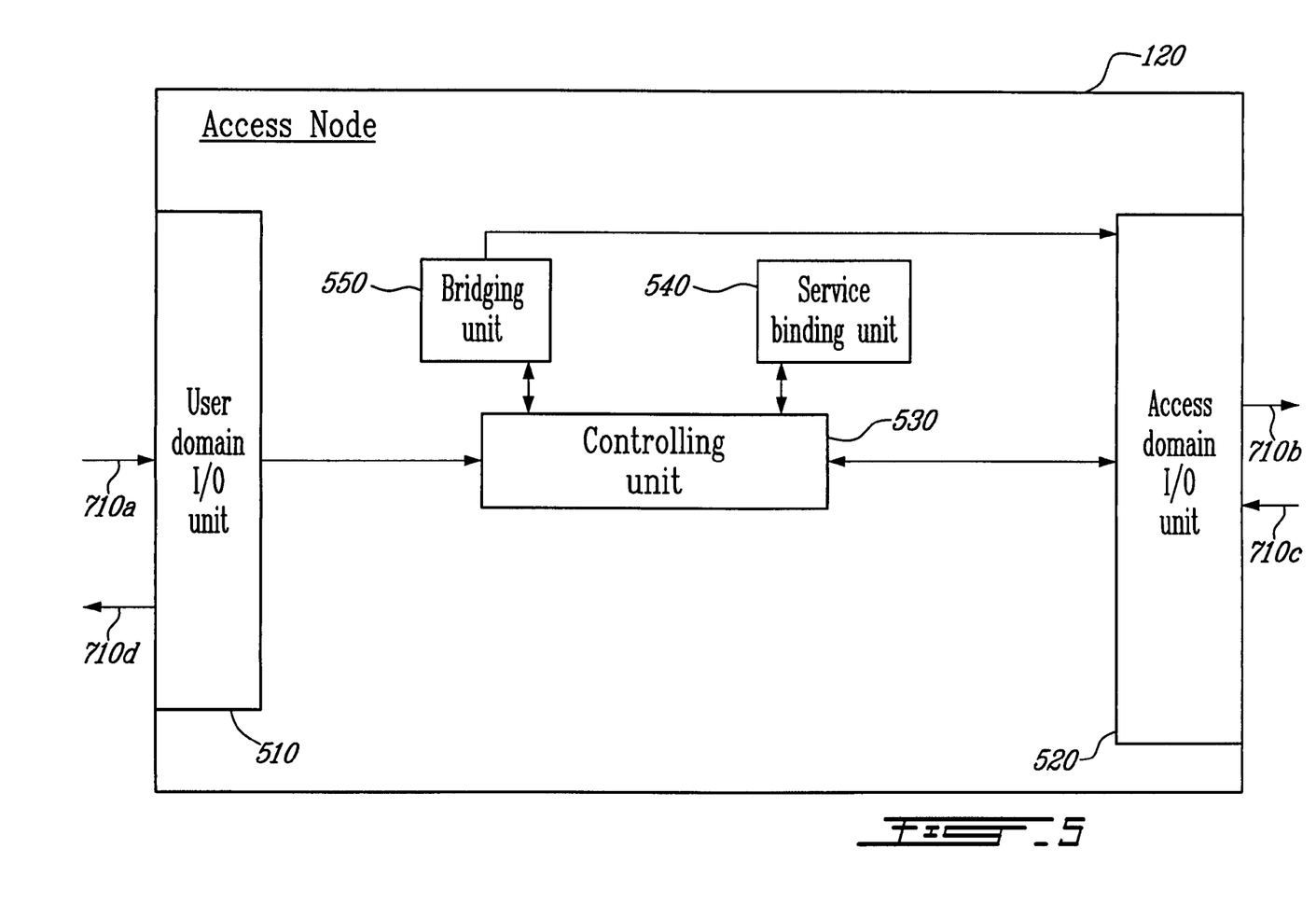
FIG. 5 is a schematic representation of an access node in accordance with the teachings of the present invention.

Reference is now made to FIG. 5, which is a schematic representation of one of the access nodes in accordance with the teachings of the present invention. Because of its location in the access domain 115, the access node 120 includes an access domain input/output unit 520 for communicating with the access network 130 of the access domain 115 and with the access edge node 160. The access node 120 also includes a user domains input/output unit 510 for communicating with the user domains 110. Thus, incoming data traffic at the access node 120 originating from/destined to user domains to which it provides access service to the access network 130, goes through the user domain input/output unit 510.

The access node 120 also includes a service binding unit 540 for hosting service bindings' related information. Service bindings related information contains specific service binding information (in the form of service agent identity and service type), identification on a port of the access node to communicate with the user domain, and local network context of the user domain. The service binding unit 540 only stores service bindings' related information for service bindings implicating the access node. Thus service binding units 540 in different access nodes 120 store different information. The service bindings' related information includes some or all of the following: service agent identifier, user port on the user domain input/output unit 510, and local context information of the user domain.

The access node 120 further includes a controlling unit 530. The controlling unit evaluates the data traffic 710a received at the user domain input/output unit 510 so as to determine required course of action. For doing so, the controlling unit 530 consults the service binding unit 540 to determine whether a service binding corresponds to the received data traffic 710a. In the event that the received data traffic corresponds to a service binding for performing user domain to user domain data traffic bridging, the controlling unit 530 forwards the received data traffic 710a to a bridging unit 550. The bridging unit 550 performs the necessary modification to the data traffic to prepare the received data traffic for perform forwarding over the access domain. More particularly, the bridging unit 550 puts the received data traffic 710 within a user data field of an Ethernet Unicast message, also called tunnelling throughout the present application. The bridging unit 550 further assigns a destination address to the Ethernet Unicast message corresponding to a virtual MAC address of the access edge node. The bridging unit 550 also assigns a source address to the Ethernet Unicast message corresponding to a virtual MAC address of the access node 120. Finally, the bridging unit may further assign a value corresponding to the port of the access domain input/output unit 520 to a VLAN Tag field of the Ethernet Unicast message.

In the present invention, the data traffic is bridged over the access domain by means of tunnelling the data traffic in a Unicast message at the access node acting as entry point of the access domain for the sending user domain. The Unicast message is sent to the access edge node, where it is redirected to the access node serving the second user domain, which is the intended recipient of the data traffic. It is thus necessary that the access node serving the recipient user domain has necessary capabilities for detunnelling the received data traffic which corresponds to tunnelled data traffic. For doing so, the controlling unit 530 further determines when the received data traffic consists of tunnelled data traffic, and proceeds with detunnelling the data traffic and forwarding to the recipient user domain through the user domain input/output unit 510.

Figure 6:
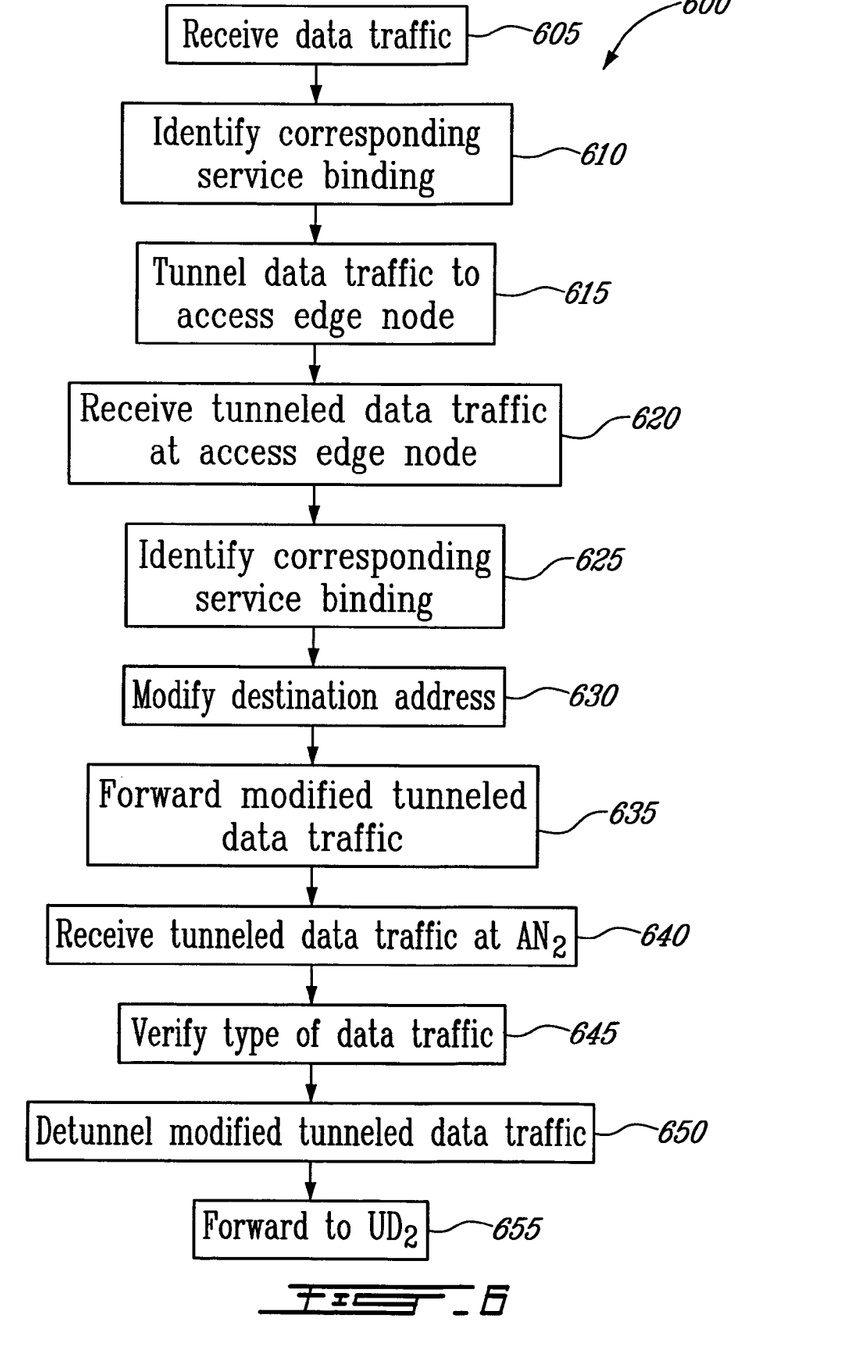
FIG. 6 is a simplified flowchart of a method for performing Layer 2 bridging in accordance with the present invention.

Reference is now made to FIG. 6 that represents a simplified flowchart of a method for bridging of data traffic over the access domain in accordance with the present invention. The method starts with a step 605 of receiving data traffic from a first user domain at a first access node. The method continues in step 610, where the controlling unit of the first access node identifies whether a service binding in the service binding unit 540 corresponds to the received data traffic. Many parameters may be used to correlate the received data traffic with the service bindings' related information. When the corresponding service binding has been identified, and the service binding corresponds to a user domain to user domain bridging service, the corresponding service agent identifier is provided to the bridging unit 550 for properly tunneling the data traffic in the Unicast message, in step 615. Step 615 also includes forwarding the tunneled data traffic through the access domain input/output unit 520, to the access edge node 160. The tunneled data traffic is then received in the access edge node 160 in step 620. The access edge node 160 identifies whether there is a service binding corresponding to the received tunneled data traffic in step 625. In accordance with the identified corresponding service binding, the access edge node modifies the destination address of the tunneled data traffic, in step 630, so as to correspond to the virtual MAC address of the access node serving the second user domain. Afterwards, the access edge node forwards the modified tunneled data traffic in step 635 over the access domain. The modified tunneled data traffic is received in the second access node in step 640. The second access node verifies the type of data traffic in step 645, and upon determining that it consists of tunneled data traffic, proceeds with detunnelling the modified tunneled data traffic in step 650. Once detunnelled, the data traffic is forward to the recipient user domain in step 655.

Figure 7:
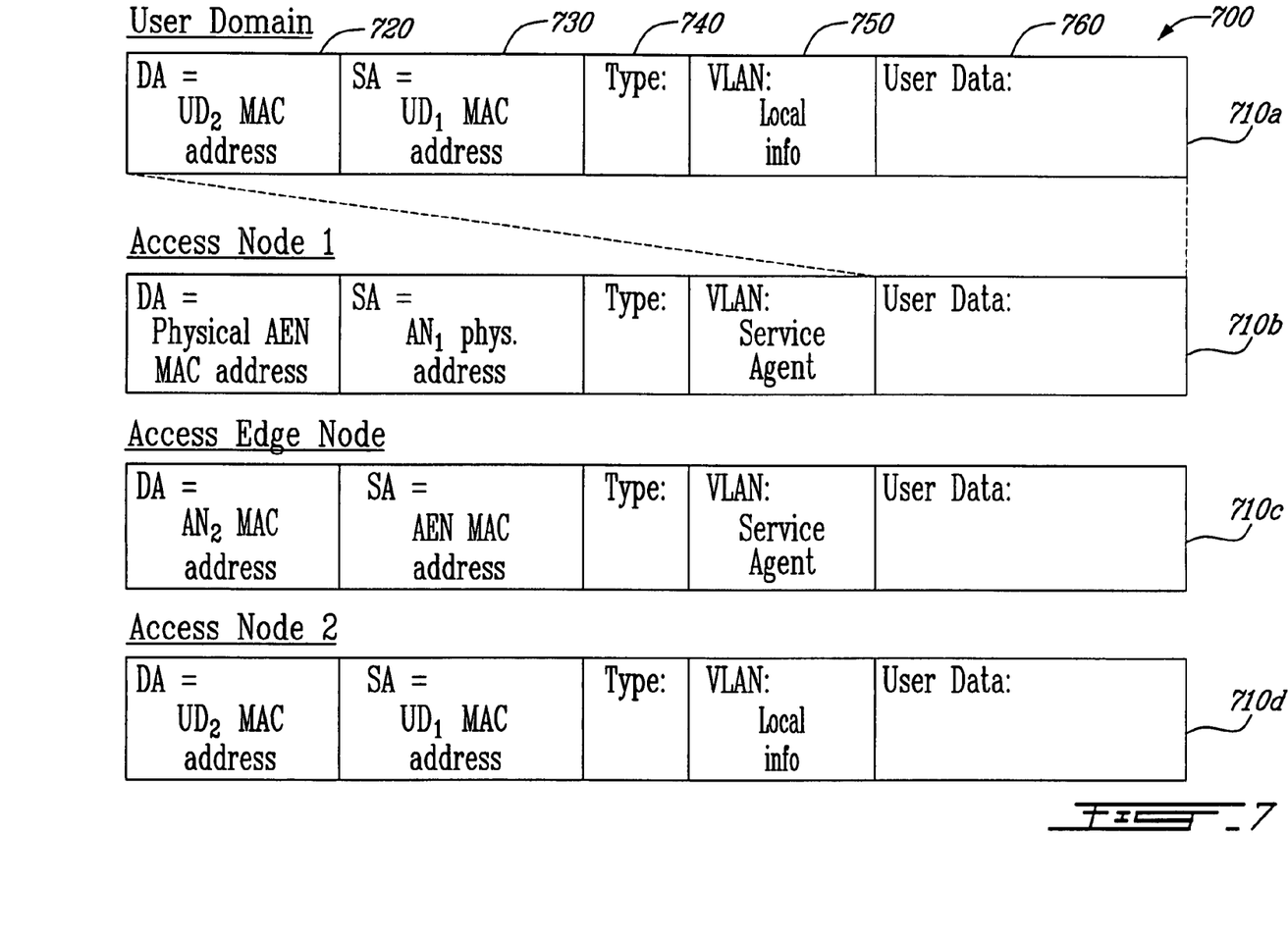
FIG. 7 is a diagram representing the modifications performed on the data traffic for its tunnelling in accordance with the present invention.

Reference is now made to FIG. 7. FIG. 7 depicts modifications performed in the network so as to perform bridging of data traffic, in accordance with the present invention. FIG. 7 depicts Ethernet messages for exemplary purposes, such as described in International Electrical and Electronic Engineering (IEEE) 802.3ac. Ethernet messages typically include the following fields: a Destination Address (DA) 720, a Source Address (SA) 730, a Type 740, a VLAN Tag 750 and User Data 760.

FIG. 7 more specifically depicts the modifications performed on Ethernet type messages so as to allow bridging of data traffic in accordance with the present invention. The first user domain sends to the first access node an Ethernet message 710a, wherein the DA corresponds to MAC address of a second user domain, the SA corresponds to a MAC address of the first user domain, and a VLAN Tag corresponding to a local info of the first user domain. At the access node, the Ethernet message is encapsulated in the User Data field of another Ethernet message 710b. The DA and SA of the Ethernet message 710 are respectively assigned the virtual MAC address of the access edge node and the virtual MAC address of the first access node, while the VLAN Tag field is used to include information relating to the input/output port used for this data traffic on the access domain input/output unit 520. The Ethernet message 710b is sent from the first access node to the access edge node where it is redirected by modifying the destination address so as to correspond to the virtual MAC address of the second access node serving the recipient user domain, as depicted in Ethernet message 710c. Finally, the Ethernet message 710c is forward to the second access node, where it is detunnelled so as to obtain Ethernet message 710d, to be forwarded to the recipient user domain.

To facilitate the management of VLAN information, an alternative that could be used is the attribution of VLAN values to access node port identification. For example, for port 0 of the access node, a VLAN value of 455 could be used, for port 1 a VLAN value of 456, and on.

As can be appreciated, the modifications to the data traffic so as to perform bridging over the access domain are visible only to the access node 120, access network 130 and the access edge node 160. The modifications to the data traffic are transparent to the user devices 110. The modifications are possible because of the service bindings created by the access edge node 160, and enforced at both the access node 120 and the access edge node 160. The service bindings stored at both the access node and the access edge node store the information required to perform the modifications to the data traffic so as to allow bridging.

Although several preferred embodiments of the method and nodes of the present invention have been illustrated in the accompanying Drawings and described in the foregoing Detailed Description, it will be understood that the invention is not limited to the embodiments and protocols disclosed, but is capable of numerous rearrangements, modifications and substitutions without departing from the spirit of the invention as set forth and defined by the following claims.

What is claimed is:

1. A method for performing bridging of data traffic over an access domain, the method comprising steps of:

receiving data traffic from a first user domain at a first access node, the data traffic being destined to a second user domain;

identifying, in the first access node, a service binding corresponding to the received data traffic;

tunneling the data traffic in a Unicast message addressed to an access edge node in accordance with the identified service binding;

forwarding the tunneled data traffic to the access edge node;

receiving the tunneled data traffic at the access edge node;

identifying, at the access edge node, the service binding corresponding to the received tunneled data traffic;

modifying, at the access edge node, a destination address on the Unicast message to correspond to an address of a second access node of the second user domain in accordance with the identified service binding;

redirecting, at the access edge node, the received tunneled data traffic to the second access node in accordance with the identified service binding therein;

receiving the redirected tunneled data traffic at the second access node;

detunneling the received redirected tunneled data traffic at the second access node; and forwarding the detunneled data traffic from the second access node to the second user domain;

wherein the service binding at the first access node contains: an input port identification at a user domain input/output unit, a first virtual access edge node MAC address and a second virtual access edge node MAC address.

2. The method of claim 1, wherein the received data traffic is included in another Unicast message.

3. The method in accordance with claim 1, wherein the service binding rules data traffic between the first and second user domains by committing their serving access nodes and the access edge node in a manner of managing data traffic therebetween over the access domain.

4. The method in accordance with claim 1, wherein:
the service binding at the second access node contains: an output port identification at a user domain input/output unit, and a second virtual access edge node MAC address; and
the service binding at the access edge node contains: a first access node MAC address, the first virtual access edge node MAC address, the second virtual access edge node MAC address, an input port identification at the access edge node and an output port identification at the access edge node.

5. The method in accordance with claim 4, wherein the step of tunneling the data traffic in the Unicast message addressed to the access edge node in accordance with the identified service binding comprises steps of:
inserting the data traffic in a user data part of the Unicast message;
assigning to a destination address of the Unicast message a MAC address of the access edge node;
assigning to a source address of the Unicast message a MAC address of the first access node; and
assigning to a Virtual Local Area Network (VLAN) Tag of the Unicast message a service agent identifier.

6. The method in accordance with claim 5, wherein the step of redirecting, at the access edge node, the received tunneled data traffic to a second access node in accordance with the identified service binding comprises steps of:
modifying the destination address to correspond to a MAC address of the second access node; and
modifying the source address to correspond to the MAC address of the access edge node.

7. The method in accordance with claim 6, wherein the step of redirecting, at the access edge node, the received tunneled data traffic to a second access node in accordance with the identified service binding further comprises a step of:
modifying a VLAN Tag field of the received tunneled data traffic so as to correspond to an input port of the second access node.

8. The method in accordance with claim 1, wherein the step of forwarding the tunneled data traffic is carried over the access domain through switches thereof.

9. The method in accordance with claim 5, further comprising a step of:
assigning to an Ethertype field of the Unicast message a value indicating that the Unicast message is for tunneled data traffic.

10. An access edge node for bridging data traffic over an access domain, the access edge node comprising:
an access domain input/output unit for receiving and sending data traffic on the access domain;
a service bindings hosting unit for storing information on service bindings implicating the access edge node, wherein each service binding comprises a first access node MAC address, a first virtual access edge node MAC address, a second virtual access edge node MAC address, an input port identification at the access edge node and an output port identification at the access edge node; and
a controlling unit for determining that the received data traffic at the access domain input unit is a Unicast message for bridging data traffic from a first user domain towards a second user domain, the controlling unit identifying with the service bindings hosting unit a service binding corresponding to the Unicast message, the controlling unit modifying a source address of the Unicast message to correspond to a MAC address of the access edge node and modifying a destination address of the Unicast message to correspond to an address of a serving access node of the second user domain in accordance with the identified service binding, the controlling unit further handing over the modified Unicast message to the access domain input/output unit for sending over the access domain.

11. The access edge node in accordance with claim 10, wherein each of the service bindings rules data traffic between the first and second user domains by committing their serving access nodes and the access edge node in a manner of managing data traffic therebetween over the access domain.

12. The access edge node in accordance with claim 10, wherein the controlling unit further changes a VLAN Tag field of the data traffic so as to correspond to an input port of the serving access node of the second user domain.

13. The access edge node in accordance with claim 10, wherein the controlling unit determines that the received data traffic at the access domain input unit is a Unicast message for bridging data traffic from a first user domain towards a second user domain because of an Ethertype field value of the Unicast message.

* * * * *

UNITED STATES PATENT AND TRADEMARK OFFICE
CERTIFICATE OF CORRECTION

| | | |
|---|---|---|
| PATENT NO. | : 7,801,039 B2 | Page 1 of 1 |
| APPLICATION NO. | : 11/353164 | |
| DATED | : September 21, 2010 | |
| INVENTOR(S) | : Monette et al. | |

It is certified that error appears in the above-identified patent and that said Letters Patent is hereby corrected as shown below:

In Column 1, Line 5, delete "S.119" and insert -- § 119 --, therefor.

In Column 1, Line 6, delete "S.1.78" and insert -- § 1.78 --, therefor.

In Column 5, Line 9, delete "6," and insert -- 6; --, therefor.

In Column 8, Line 25, delete "etc . . ." and insert -- etc. --, therefor.

In Column 8, Line 63, delete "etc . . ." and insert -- etc. --, therefor.

Signed and Sealed this
Fifteenth Day of March, 2011

David J. Kappos
*Director of the United States Patent and Trademark Office*